Patented Feb. 23, 1926.

1,574,676

UNITED STATES PATENT OFFICE.

HAROLD A. MORTON, OF AKRON, OHIO, ASSIGNOR TO THE MILLER RUBBER COMPANY, OF AKRON, OHIO, A CORPORATION OF OHIO.

PROCESS OF PRODUCING A RUBBER COMPOUND.

No Drawing. Application filed April 8, 1924. Serial No. 705,105.

*To all whom it may concern:*

Be it known that I, HAROLD A. MORTON, a citizen of the United States, and resident of Akron, in the county of Summit and State of Ohio, have invented certain new and useful Improvements in Processes of Producing a Rubber Compound, of which the following is a specification.

My present invention relates to an improvement in the art of vulcanizing rubber compounds and more especially to the use of vulcanization accelerators and the activators thereof.

Certain difficulties have always been encountered in the use of ingredients which accelerated vulcanization either by reducing the amount of time or temperature necessary for vulcanization. In the mixing and calendering operations it was found that the presence of such ingredients causes partial or total vulcanization to occur prematurely due either to the heat generated from mixing the stock or used in warming the calender rolls. It has been found that some accelerators are slower in action than others, so much so that where certain accelerators when mixed in a rubber compound will cause vulcanization to occur at ordinary room temperatures in a few days' time and at slightly higher temperatures in a few hours' time. Others show an appreciable shortening of the time of vulcanization only when raised to the temperatures ordinarily employed in vulcanizing rubber compounds not containing accelerators.

It has been known for some time that certain metallic oxides, which are themselves not accelerators, enhance the action of most organic accelerators. That is, the presence of a metallic oxide often causes the organic accelerator to act in a shorter time or at a lower temperature. The cause of such action is not known but the effect is utilized universally in usual factory practice.

A notable example of such a metallic oxide is zinc oxide which is probably the most universally used compounding ingredient in the rubber industry.

Zinc oxide is not the only material which acts in this manner, some zinc salts and some other metallic salts act in this way. Such materials are usually termed "activators."

I have discovered that rubber compounds may be prepared containing unvulcanized rubber, sulphur, accelerator, (which is low temperature curing in the presence of an activator) and coloring matters or other inactive ingredients but not containing zinc oxide or other activators and which would ordinarily require a high temperature to cause vulcanization to occur therein, and that after such rubber compounds are calendered to produce a thin sheet of rubber and this rubber is then dusted with finely powered zinc oxide and the sheet then subjected to vulcanization temperatures, vulcanization will occur at as low a temperature and in nearly as short a time as it would have occurred had the zinc oxide been thoroughly mixed into the original compound. However, it will readily be apparent that if the zinc oxide had originally been mixed in the compound, the mixing and calendering of this stock would have been extremely difficult without "burning" or partially vulcanizing the stock. It will thus be seen that I have devised a new way by which the danger of "burning" or prevulcanization may be obviated.

The action of the activator is difficult to understand but it would appear that the accelerator must have to migrate to the surface of the sheet and there in some way be affected by the zinc oxide and afterwards migrate back into the sheet in order for vulcanization to occur at low temperatures, as zinc oxide itself is unable to migrate through rubber stock.

As a specific example of my process the following compound is prepared:

| | Parts. |
|---|---|
| Smoked sheet rubber | 97¼ |
| Dimethyl amine carbon bisulphide product | ¾ |
| Sulphur | 2 |

These ingredients are thoroughly incorporated on a mixing mill and the compound is then sheeted out on a calender to a thickness of approximately 1/128 of an inch. As this sheet leaves the calender it is thoroughly dusted with finely divided zinc oxide and is then rolled up on itself and cured for a period of approximately 24 hours at 150° F.

Another method of operating this invention consists in mixing and calendering the stock into sheets, building the final article from the uncured sheets and imbedding the article in finely divided zinc oxide, either pure or diluted with an inert carrier (such as starch). The imbedded article is then heated to a temperature of 150° F. whereupon vulcanization takes place.

It is obvious that the rubber compound may contain in addition to sulphur and a low temperature curing accelerator any of the usual compounding ingredients which are not activators. It is also obvious that other activators may be used in place of zinc oxide.

Having thus described my invention, what I claim is:—

The process of producing vulcanized rubber which consists in mixing rubber with sulphur and an accelerator, calendering the same into a sheet of suitable thickness, applying an activator to the surface of the sheet, rolling the sheet upon itself, and curing the same.

In testimony whereof, I affix my signature.

HAROLD A. MORTON.